United States Patent [19]

Luro

[11] Patent Number: 5,433,342
[45] Date of Patent: Jul. 18, 1995

[54] METHOD AND APPARATUS FOR SUPPLYING PRESET QUANTITIES OF LIQUIDS

[75] Inventor: Claude Luro, Gujan-Mestras, France

[73] Assignee: Establissements Luro (S.A.R.L.), Gujan-Mestras, France

[21] Appl. No.: 993,074

[22] Filed: Dec. 18, 1992

[30] Foreign Application Priority Data

Dec. 20, 1991 [FR] France ................. 91 16276

[51] Int. Cl.⁶ ........................... B67D 5/16
[52] U.S. Cl. .......................... 222/1; 222/14; 222/71
[58] Field of Search ............... 222/14, 71, 1; 235/94 A, 94 R

[56] References Cited

U.S. PATENT DOCUMENTS

| | | | |
|---|---|---|---|
| 3,266,425 | 8/1966 | Brunson | 222/72 |
| 3,756,456 | 9/1973 | Georgi | 222/14 X |
| 3,773,219 | 11/1973 | Irie et al. | 222/14 X |
| 4,254,328 | 3/1981 | Murray et al. | 222/14 X |
| 4,354,620 | 10/1982 | Tsuneda et al. | 222/14 |
| 4,442,953 | 4/1984 | Miyamoto et al. | 222/14 |
| 4,572,405 | 2/1986 | Miura | 222/14 |
| 4,595,122 | 6/1986 | Yoshida et al. | 222/14 |
| 4,726,492 | 2/1988 | Komukai | 222/14 |
| 4,927,056 | 5/1990 | Glover | 222/1 |
| 5,024,347 | 6/1991 | Baldwin | 222/14 X |

FOREIGN PATENT DOCUMENTS

| | | | |
|---|---|---|---|
| 56-142198 | 11/1981 | Japan | 222/14 |
| 2170782 | 8/1986 | United Kingdom | 222/14 |
| 2242889 | 10/1991 | United Kingdom | 222/14 |
| 86-04572 | 8/1986 | WIPO . | |

*Primary Examiner*—Andres Kashnikow
*Assistant Examiner*—Lisa Douglas
*Attorney, Agent, or Firm*—Sandler, Greenblum & Bernstein

[57] ABSTRACT

Method and apparatus for supplying a preset quantity of a liquid, using a tank containing the liquid, a check valve distributor, and a hose connecting the tank to the check valve distributor, and having a pumping unit, a solenoid valve, and a pulsed flow meter interposed between the tank and the check valve distributor, including determining a volume difference between a first quantity delivered by the apparatus and a first quantity detected by pulsed flow meter, as the liquid is pumped at constant flow rate, low pressure and under laminar flow, during a first delivery of the liquid; starting a subsequent delivery of the preset quantity of the liquid, by opening the solenoid valve; and stopping the subsequent delivery of the preset quantity of the liquid when a difference between the number of pulses generated by the pulsed flow meter corresponding with the preset quantity, and the number of pulses output by the pulsed flow meter reaches a number of pulses corresponding to the volume difference; and during a subsequent delivery, the liquid flows inside the hose at a same constant flow rate, under a low pressure, and under laminar flow, as during the first delivery of the liquid.

20 Claims, 1 Drawing Sheet

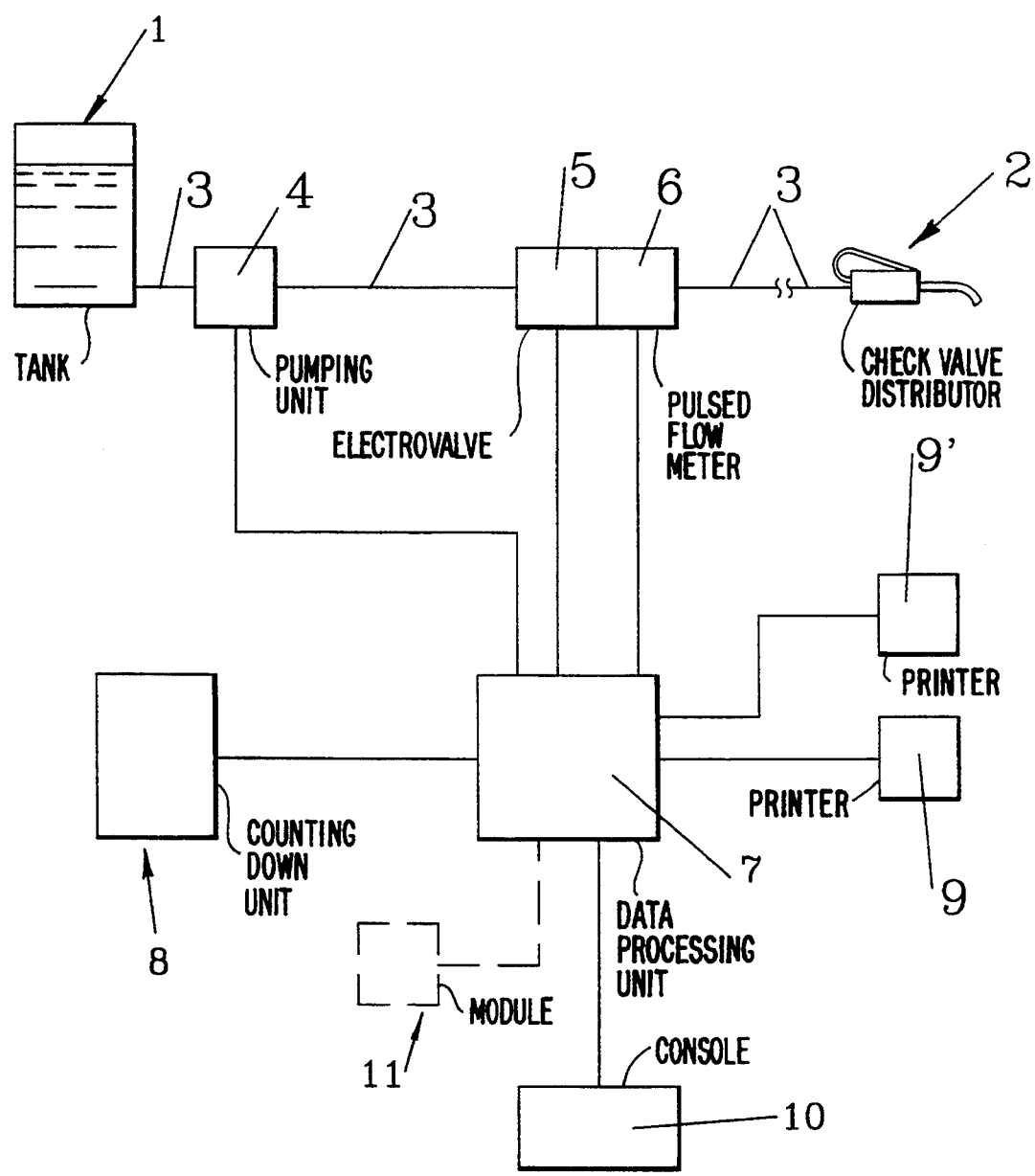

METHOD AND APPARATUS FOR SUPPLYING PRESET QUANTITIES OF LIQUIDS

BACKGROUND OF THE INVENTION

1. Field of the Invention

The present invention relates to the supplying of preset quantities of fluids, particularly viscous liquids such as lubricants.

2. Background and Related Information

At present, there are no systems for the reliable (i.e., precise) and accurate supply of measured quantities of liquids, such as hydrocarbons, to a customer or user preselecting a bulk quantity of the liquid. It is desirable to provide for the delivery of preselected, measured, bulk quantities of liquids in a manner which is precise and accurate enough to comply with the regulations concerning distribution of liquids for public use.

Regulations concerning apparatuses for supplying preselected quantities of liquids require that the difference between the desired quantity of the liquid and the delivered quantity of the liquid (which is used for quoting the price the buyer will have to pay), should not exceed a ratio set at five parts per thousand. In most cases, known apparatuses exceed this accuracy threshold, and also vary to a great extent for identical preselected quantities (i.e., lack precision in repeatedly supplying a given quantity of a liquid).

U.S. Pat. No. 4,442,953 discloses an apparatus for supplying preselected quantities of fluids, particularly hydrocarbons. The apparatus comprises a pump driven by a motor, a flow meter mounted downstream of the pump, and a control circuit. The flow meter generates a number of electric pulses proportional to the quantity of liquid passing through the flow meter. The control circuit is connected to both the motor and the flow meter. This apparatus is designed to ensure that the preselected quantity is actually delivered.

In the operation of this apparatus, before the apparatus is set to work, a curve showing an oversupply quantity of liquid is drawn. The shape of the curve depends upon the flow quantity indicated by the flow meter. The curve is taken as a compensating reference for the pump inertia. The curve is stored in the control circuit. During delivery of the fluid, for each measured quantity preset by a user, the circuit counts the number of pulses generated by the flow meter. When this count reaches a value equal to the number of pulses which coincides with the preset quantity minus the number of pulses corresponding to the flow quantity measured by the flow meter according to the stored reference curve, the motor of the pump is then deactivated (i.e., stopped).

However, this apparatus does not guarantee the accuracy of measured quantities of delivered liquids. This is because the reference curve is valid only for the conditions of its calculation. These conditions are not necessarily the same for future deliveries of liquids, due to variations in the temperature of the liquid, which generates variations in the viscosity of the liquid, the speed of the pump driving motor, and in the liquid manometric lift, particularly in the tank.

Such apparatuses do not always meet the minimum legal requirements (i.e. $\leq 0.5\%$), and are unfit for supplying preset quantities of viscous liquids, particularly lubricants, since their higher viscosity generates flow variations which are much higher than the flow variations of non-viscous or slightly viscous hydrocarbon liquids.

PCT Application WO-A-8604572 discloses a system for reliably and accurately supplying preset small quantities of a liquid. More specifically, this system is designed for adjusting the quantity of liquid of a photographic developer bath. The system operates by establishing the difference between the measured quantity and the quantity actually delivered for each delivery, and rectifies the following delivery accordingly.

Such a method by no means guarantees an accurate measuring of the quantity delivered, since the quantity is not readjusted, an operation which, in any event, cannot be performed, the difference observed simply being integrated to the next delivery.

SUMMARY OF THE INVENTION

Accordingly, the present invention is intended to provide a system for supplying preset quantities of liquids, particularly, although not exclusively, viscous liquids such as lubricants. This system overcomes the inaccuracy of known supplying apparatuses, by reducing variations in the value of a preset quantity actually delivered down to an extremely narrow variation range, which is below the maximum difference (i.e. $\leq 0.5\%$) permitted by regulations.

It is therefore an object of the present invention to provide a method for supplying preset quantities of fluids, and particularly viscous liquids, by means of an apparatus. The apparatus for supplying the preset quantity of liquid comprises a tank (containing the liquid to be delivered) and a delivery means equipped with a check valve, and a pipe (i.e. hose) connecting the tank with the delivery means. The delivery means comprises a means for causing the liquid to flow (i.e. a pumping unit) and a pulsed flow meter (i.e., a pulsed flow meter, i.e., a meter for counting the number of pulses) are located along the pipe. By means of the invention, the liquid is caused to flow inside the pipe at a generally constant flow rate, under a low pressure, and under laminar flow conditions. The apparatus further comprises an electrovalve, and a pulsed flow meter positioned immediately downstream of the electrovalve; an electronic data processing installation connected to the electrovalve, the flow meter, and the means for causing the liquid to flow; a counter, for counting down pulses, said counter being connected to said electronic data processing installation; and, optionally but preferably, a display and dialogue console connected to said electronic data processing installation.

In operation of the apparatus, a desired quantity of fluid (i.e. a liquid) is preselected (and preferably displayed), and the number of pulses corresponding to the desired quantity is determined (i.e., calculated). The delivery of the liquid is then initiated, and continued until termination at a point at which the difference between the determined number of pulses and the number of pulses produced by the flow meter reaches a value previously determined in accordance with the characteristics of said apparatus, so that the difference between the final delivered quantity and the preset quantity is less than or equal to a predetermined maximum difference. The method is characterized in that the liquid flows inside the pipe at a continuous flow rate, at low pressure and laminar state (i.e., under laminar flow). The previously determined value is a constant for a given apparatus and a given liquid.

The previously determined value is arrived at in accordance with the characteristics of the apparatus and the fluid. The determination of the previously determined value comprises measuring the volume difference between the delivered fluid quantity and the fluid quantity detected by the flow meter of the apparatus, under the conditions of constant flow rate, low pressure and laminar flow, and in taking a number of pulses of the flow meter which corresponds to a volume equal to or close to said volume difference as said value. In this manner, a given apparatus can be calibrated for precisely and accurately dispensing a desired quantity of a given fluid.

Other characteristics and advantages of the invention will stand out from the following description of one embodiment of an apparatus for supplying liquids using the method of the present invention, such description being given as an example only and referring to the single FIGURE.

BRIEF DESCRIPTION OF THE DRAWINGS

The single FIGURE is a diagrammatic representation of an apparatus for supplying a preset quantity of a liquid, preferably a lubricating oil.

DETAILED DESCRIPTION OF THE INVENTION

In the FIGURE, there is shown an oil tank (1), a check valve distributor (2), calibrated at 0.5 bar for example, and connected to the tank (1) by means of a hose (3), wherein there is inserted a fluid circulating means comprising a pumping unit (4) with or without variable speed gear, an electrovalve (5) and a pulse flow meter (6) placed immediately downstream of the electrovalve (5).

According to the invention, the pumping unit (4) comprises a positive displacement pump, for example a gear pump fitted in relation to the tank (1) so as to be constantly filled. Furthermore, according to the invention the hose (3) has a large diameter which corresponds precisely to the diameter of the gear pump outlet, or which is equal to two or three times the latter, so that the liquid flows inside the hose at low pressure and laminar state, thereby ensuring a constant flow rate without inertia of masses.

The efficiency of the apparatus is such that the distance between the pump and the delivery point can theoretically be unlimited, and that, in practice, only the mass moment of inertia can be a bar to the true delivery. Tests have shown that with a flow rate of 8 to 15 liters per minute and a viscosity of 3000 millipascals per second, no inaccuracy was registered at 100 meters from the pump.

In general, the apparatus and method of the invention are capable of delivering a preset quantity of a liquid with an accuracy of from about 0 to 5 parts per thousand (i.e. from about 0 to 0.5%), based on the desired quantity. Preferably, the apparatus and process obtain an accuracy within a ratio set at one part per thousand (i.e., from about 0 to 0.1%), based on the desired quantity.

The apparatus embodied in elements (1) through (6) of the figure differs from apparatuses supplying hydrocarbons, non-viscous liquids, and slightly viscous liquids by means of vane or turbine pumps, and do not guarantee a constant flow rate when the viscosity of the product varies. The apparatus of the present invention guarantees a constant flow rate when the viscosity of the product varies. The apparatus of the invention also differs from known oil supplying apparatuses which use a compressed air pump or a vane pump whose flow rate positively or negatively changes as the viscosity of the oil varies, a phenomenon which also does not guarantee the accuracy of the quantity delivered.

An electronic data processing installation (7) is connected to the pumping unit (4), the electrovalve (5), the flow meter (6), a counting and counting down unit (8), a printer (9) and a display and dialogue console (10), which comprises a keyboard and a display screen. Optionally, the apparatus may further comprise a module (11) for entering a magnetic card or other form of data input.

The electrovalve (5) is located upstream of the flow meter (6) and only opens when a demand for delivery is accepted. The flow meter (6) is an electronic meter generating a pulse each time a predetermined quantity of liquid passes therethrough, for example one pulse (double chain) for each 10 ml of liquid passage therethrough.

The invention will now be described with respect to the supply of preset quantities of lubricating oil for motor vehicles, because this product is generally required in a quantity which has been previously determined. Supplying motor fuel does not pose the same problem since the driver does not ask for a precise quantity of fuel but rather, for a quantity of fuel which corresponds to a determined amount of money. Obviously, the driver can stop the delivery when the flow meter, and not the money meter, has reached the desired value, at which point the quantity actually delivered corresponds to the displayed quantity within the limits imposed by regulations ($\leq 0.5\%$). However, stopping the delivery at a precisely desired quantity is uncertain since it requires skill and experience which are beyond the capacity of most people.

Actually, this fuel supplying system cannot accurately deliver a preset quantity since it cannot stop the delivery when the counting means has reached said preset quantity so as to deliver the corresponding quantity within said regulations limits.

Indeed, when the meter displays a specific value, ten liters for example, it can be noted that the quantity actually delivered by the distributor is not ten liters but a value which is slightly higher. This is due to the inevitable delay arising between the detection of the quantity of liquid flowing inside the metering chamber of the meter, and the actual closing of the electrovalve and the check valve of the distributor. Such delay is specific to each apparatus and depends on the technical and construction characteristics of the apparatus components.

It should be noted that the delay can vary for the same apparatus from one time to another as well as it can vary according to other parameters unconnected with the apparatus, such as the nature and viscosity of the liquid delivered, and atmospheric conditions (i.e., temperature, pressure, etc.).

In a preliminary phase, the process according to the invention comprises accurately measuring the volume difference between the quantity delivered by the distributor (2) and the corresponding quantity displayed by the meter (6), the liquid flowing in the hose (3) at constant flow rate, low pressure, and under laminar flow.

It should also be noted that with the same type of liquid and under the same temperature and pressure conditions, the volume difference is independent of the quantity delivered by the distributor (2). By knowing the value of the difference and the number of pulses per volume unit produced by the meter (6), one can determine the number of pulses which have to be taken into account so that the volume of liquid actually delivered equals the volume of liquid preselected by the user.

The number of pulses are hereinafter termed "rating pulses", by analogy with the rating adjustment of a weight measuring system.

In operation, the user displays the desired oil quantity on the displaying equipment of the console (10). The electronic data processing installation (7) then loads the counter (8) with a quantity of pulses corresponding to the displayed volume. As soon as the user validates, the electronic data processing installation (7) starts the pumping unit (4), the electrovalve (5), and the meter (6), and oil is delivered by the distributor (2) under the above-mentioned conditions, namely constant flow, low pressure, and laminar flow.

As the oil is delivered, the meter (6) sends so-called "counting down pulses" to the counting and counting down unit (8) (i.e., the counter), through to the electronic data processing installation (7). When the counter (8) counts down to the number of rating pulses previously stored in the electronic data processing installation (7), the data processing installation stops the electrovalve (5). The counter (8) is then reset to zero.

It is to be noted that the result would be the same if the number of pulses corresponding to the displayed volume is reduced by the number of rating pulses through the electronic data processing unit (7) prior to being entered into the counter (8), if the electrovalve (5) is stopped when the counter (8) is reset to zero. The electronic data processing unit (7) only needs to be programmed accordingly.

The number of rating pulses is determined so that the potential variations in the difference between the delivered quantity and the displayed quantity are preferably as close to zero as possible, and, in any event, lower than the threshold set by regulations.

In order to make sure the liquid flow is constant inside the hoses (3), the pumping unit (4) comprises a regulated speed motor.

Optionally, the apparatus can further comprise a module (11), which enables the user to have access to the system by means of a magnetic card, or its equivalent, when needed.

The electronic data processing unit (7) together with the counter (8) and module (11) may control and check several circuits simultaneously. Each of the circuits may deliver a plurality of different products and comprise a plurality of different stations. Each station could comprise an electrovalve (5) and meter unit (6), as described above.

The printer (9) enables the editing of delivery tickets or invoices identifying the selected product, the reference of the operation (i.e. location of sale and identity of seller), the delivered quantity, possibly the price per unit quantity and the total sales price for the quantity delivered, and the operator's identity, if a magnetic card input module (11) is present. An additional printer (9') is advantageously provided for editing operations, logs, products management (i.e., inventory), etc.

The process of the invention enables the delivery of preset quantities of liquid of various densities and viscosities, with a guaranteed accuracy which can be close to zero error and within the required accuracy, and which is below the maximum permissible inaccuracy of current regulations, that is a maximum of one error per one thousand, in accordance with the International Organization for Legal Metrology regulations.

The invention is obviously not confined to the embodiment represented and described herein, but covers all the variations represented and described herein which may be made particularly as far as the arrangement of the supplying apparatus, the nature and the arrangement of the means controlling and stopping the delivery and the flow meter, especially insofar as the latter generates a number of pulses which is proportional to the metered volume. Finally, although the invention has, as has been noted above, been described with reference to particular means, materials and embodiments, it should be noted that they are not intended to be limiting, and that many variations and modifications are possible without departing from the scope of the invention.

What is claimed is:

1. A method for delivering a preset quantity of a liquid using an apparatus comprising a conduit communicating a reservoir containing the liquid with a check valve distribution device, and having a pump, a solenoid valve, and a pulsed flow meter interposed between the reservoir and the check valve distribution device, the process comprising the steps of:

determining a volume difference during a first delivery of the liquid between a first quantity of liquid delivered by the apparatus and a first quantity detected by the pulsed flow meter, as the liquid is pumped at constant flow rate, low pressure and under laminar flow;

predisplaying a desired quantity of the liquid to be delivered in a subsequent delivery;

opening the solenoid valve to start the subsequent delivery of the desired quantity of the liquid, with the liquid being pumped at the same constant flow rate, low pressure, and under laminar flow, as during the first delivery of the liquid; and stopping the subsequent delivery of the desired quantity of the liquid when a difference between:
   (i) a number of pulses of the pulsed flow meter corresponding to the desired quantity, and
   (ii) the number of pulses from the pulsed flow meter, reaches a number of pulses corresponding to the volume difference.

2. The method as described in claim 1, wherein the liquid comprises a lubricant.

3. The method as described in claim 1, wherein the liquid comprises a hydrocarbon.

4. The method as described in claim 1, wherein the liquid comprises an oil.

5. The method as described in claim 1, wherein during the subsequent delivery of the liquid, the difference between the number of pulses of the pulsed flow meter corresponding to said desired quantity, and the metered quantity actually delivered, is from about 0 to about 0.5 percent, based on the desired quantity.

6. The method as described in claim 5, wherein the difference between the number of pulses of the pulsed flow meter corresponding to said desired quantity, and the metered quantity actually delivered, is from about 0 to about 0.1 percent, based on the desired quantity.

7. The method as described in claim 1, wherein the liquid has a flow rate through the conduit of from about 8 to 15 liters per minute, and a viscosity of about 3000 millipascals per second, and wherein there is no substantial inaccuracy registered at 100 meters from the pump.

8. The method as described in claim 1, wherein the number of pulses of the pulsed flow meter corresponding to the desired quantity is loaded into a counter, and the number of pulses from the pulsed flow meter are counted down in the counter during delivery of the liquid, and the subsequent delivery is stopped when the counter reaches the number of pulses corresponding to a liquid volume substantially equal to said volume difference.

9. The method as described in claim 8, wherein said determining a volume difference during a first delivery of the liquid comprises a determination of the number of pulses corresponding to the liquid volume substantially equal to said volume difference.

10. The method as described in claim 1, wherein the number of pulses corresponding to the desired quantity is loaded into a counter, and the number of pulses corresponding to a liquid volume substantially equal to said volume difference are deducted from the number of pulses corresponding to the desired quantity, and during the delivery of the liquid, the pulses of the pulsed flow meter are counted down in the counter, and the subsequent delivery is stopped when the counter reaches zero.

11. An apparatus for supplying a preset quantity of a liquid to be supplied, said apparatus comprising:
   a check valve distributor connected to a tank containing the liquid to be supplied through a hose;
   means for flowing the liquid under conditions of a constant flow, a low pressure, and under laminar flow conditions;
   an electrovalve and a pulsed flow meter positioned adjacent and downstream of the electrovalve;
   an electronic data processing installation connected to the electrovalve, the flow meter, and the means for flowing the liquid;
   a counter, for counting down pulses, said counter being connected to said electronic data processing installation; and
   a display and dialogue console connected to said electronic data processing installation.

12. The apparatus as described in claim 11, wherein the hose has a diameter which is at least equal to a diameter of an outlet of the means for flowing the liquid, so that the liquid flows inside the hose at a low pressure and under laminar flow, thereby ensuring a constant flow rate.

13. The apparatus according to claim 11, further comprising a module for entering a magnetic card or other form of data input, said module enabling a user to have access by means of a magnetic card.

14. The apparatus according to claim 11, further comprising a printer.

15. The apparatus as described in claim 14, wherein the printer enables the editing of a delivery ticket or an invoice identifying a selected product, an identity of a seller, a delivered quantity, a price per unit quantity, a total sales price for a quantity delivered, and an operator's identity.

16. The apparatus according to claim 11, wherein said means for flowing the liquid comprises a gear pump driven at a regulated speed, and said hose has a diameter which is at least equal to the diameter of an outlet of said pump.

17. The apparatus according to claim 16, wherein said gear pump comprises a positive displacement pump, and the pump is fitted in relation to the tank so as to be constantly filled.

18. A process for supplying a preset quantity of a liquid, with an apparatus comprising a tank containing the liquid, a check valve distributor, and a hose connecting the tank to the check valve distributor, and having a pumping unit, a solenoid valve, and a pulsed flow meter interposed between the tank and the check valve distributor, said process comprising:
   determining a volume difference between a first quantity delivered by the apparatus and a first quantity detected by pulsed flow meter, as the liquid is pumped at constant flow rate, low pressure and under laminar flow, during a first delivery of the liquid;
   starting a subsequent delivery of the preset quantity of the liquid, by opening the solenoid valve; and
   stopping the subsequent delivery of the preset quantity of the liquid when a difference between the number of pulses generated by the pulsed flow meter corresponding with the preset quantity, and the number of pulses output by the pulsed flow meter reaches a number of pulses corresponding to said volume difference; and
   wherein during a subsequent delivery, the liquid flows inside said hose at a same constant flow rate, under a low pressure, and under laminar flow, as during the first delivery of the liquid.

19. An apparatus for supplying a preset quantity of a liquid to be supplied, said apparatus comprising:
   a check valve distributor connected to a tank containing the liquid to be supplied through a hose;
   means for flowing the liquid under conditions of a constant flow, a low pressure, and under laminar flow conditions;
   an electrovalve and a pulsed flow meter positioned adjacent and downstream of the electrovalve;
   an electronic data processing installation connected to the electrovalve, the flow meter, and the means for flowing the liquid; and
   a counter, for counting down pulses, said counter being connected to said electronic data processing installation.

20. The method as described in claim 1, wherein the liquid is a viscous liquid.

* * * * *